(12) United States Patent
Brunn et al.

(10) Patent No.: US 7,653,127 B2
(45) Date of Patent: Jan. 26, 2010

(54) BIT-EDGE ZERO FORCING EQUALIZER

(75) Inventors: Brian T. Brunn, Austin, TX (US); Stephen D. Anderson, Minnetonka, MN (US)

(73) Assignee: XILINX, Inc., San Jose, CA (US)

( * ) Notice: Subject to any disclaimer, the term of this patent is extended or adjusted under 35 U.S.C. 154(b) by 854 days.

(21) Appl. No.: 10/791,924

(22) Filed: Mar. 2, 2004

(65) Prior Publication Data
US 2005/0195893 A1    Sep. 8, 2005

(51) Int. Cl.
*H03K 5/159* (2006.01)

(52) U.S. Cl. .................. 375/232; 375/229; 375/295; 375/296; 375/346; 375/241; 375/242; 375/243; 375/253; 375/254; 708/322; 708/323; 708/506; 333/20

(58) Field of Classification Search .......... 375/232, 375/229, 346, 254, 242, 241
See application file for complete search history.

(56) References Cited

U.S. PATENT DOCUMENTS

| 3,876,941 | A | * | 4/1975 | Kohlenberg et al. ......... 375/285 |
| 4,694,468 | A | * | 9/1987 | Cullum ....................... 375/224 |
| 4,852,169 | A | * | 7/1989 | Veeneman et al. .......... 704/207 |
| 5,058,130 | A | * | 10/1991 | Park ........................... 375/230 |
| 5,249,150 | A | * | 9/1993 | Gruber et al. ............... 702/195 |
| 5,429,150 | A | * | 7/1995 | Siefers, Jr. .................. 137/177 |
| 5,430,768 | A | * | 7/1995 | Minuhin et al. ............. 375/340 |
| 5,517,527 | A | * | 5/1996 | Yu .............................. 375/233 |
| 5,586,144 | A | * | 12/1996 | Kahlman et al. ............ 375/229 |
| 5,889,827 | A | * | 3/1999 | Bottomley et al. .......... 375/350 |
| 6,058,404 | A | * | 5/2000 | Mahant-Shetti et al. ..... 708/301 |
| 6,246,731 | B1 | * | 6/2001 | Brianti et al. ............... 375/341 |
| 6,570,406 | B2 | * | 5/2003 | Tang et al. .................... 326/86 |
| 6,628,728 | B1 | * | 9/2003 | McCarty, Jr. ................ 375/296 |
| 6,956,917 | B2 | * | 10/2005 | Lenosky ...................... 375/350 |
| 7,038,730 | B2 | * | 5/2006 | Markman et al. ............ 348/607 |
| 7,110,448 | B2 | * | 9/2006 | Bergmans et al. ........... 375/233 |
| 7,142,613 | B2 | * | 11/2006 | Beaulieu ..................... 375/295 |
| 2003/0174780 | A1 | * | 9/2003 | Heikkila ..................... 375/259 |

(Continued)

OTHER PUBLICATIONS

Edward A. Lee and David G. Messerschmitt, Digital Communication, 1994, Kluwer Academic Publishers, second edition, p. 189.*

(Continued)

*Primary Examiner*—Chieh M Fan
*Assistant Examiner*—Siu M Lee
(74) *Attorney, Agent, or Firm*—Shayne X. Short; Michael T. Wallace; Thomas George

(57) ABSTRACT

Bit-Edge Zero Forcing Equalizer. A novel solution is presented by which a BE-ZFE (Bit-Edge Zero Forcing Equalizer) is employed to drive an error term within a data signal to an essentially zero value. This new BE-ZFE looks at values of data that occur at the bit edges of a data signal and drives the associated error term to zero. The new BE-ZFE is appropriately implemented within communication systems that are phase (or jitter) noise limited. Some examples of such communication systems include high-speed serial links one type of which serviced using a SERDES (Serializer/De-serializer) where data that is originally in a parallel format is serialized into a serial data stream and then subsequently de-serialized back into a parallel data stream.

18 Claims, 10 Drawing Sheets

U.S. PATENT DOCUMENTS

2004/0252755 A1* 12/2004 Jaffe et al. .................. 375/233
2007/0183540 A1* 8/2007 Agazzi et al. ............... 375/341

OTHER PUBLICATIONS

J. Sinsky et al.; "Duobinary Signaling for 10+Gb/s Short and Long Reach Transmission Over Electrical Backplanes"; Jan. 12, 2004; Lucent Technologies; Copyright 2004 Optical Internetworking Forum; pp. 1-11.

J. Sinsky et al.; "10 Gb/s Duobinary Signaling over Electrical Backplanes—Experimental Results and Discussion"; Lucent Technologies; Lucent Technologies 2004; pp. 1-18.

Lee et al., "Digital Communication," Second Edition, Aug. 1993, p. 192, published by Kluwer Academic Publishers, now Springer Science+Business Media Deutschland GmbH, Berlin, Germany.

* cited by examiner

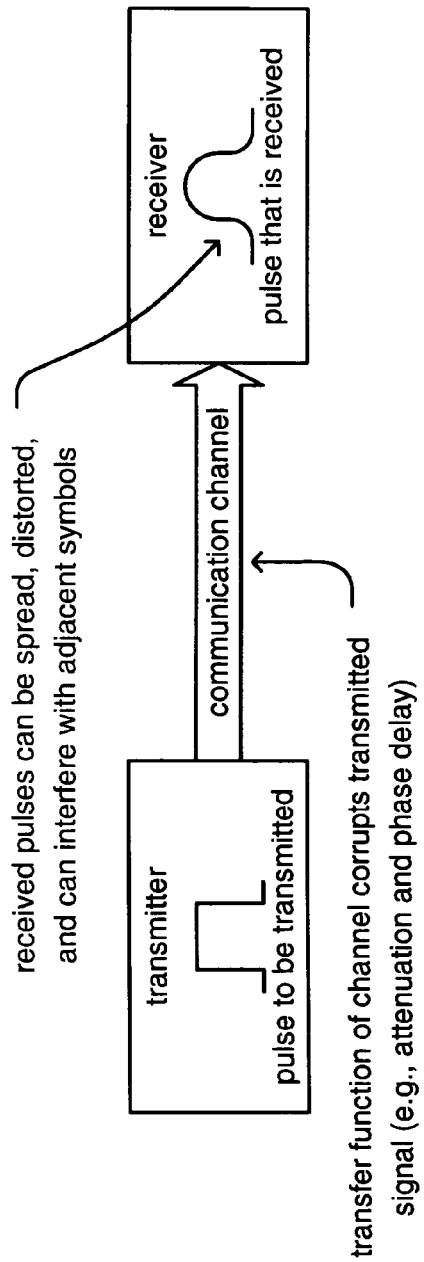
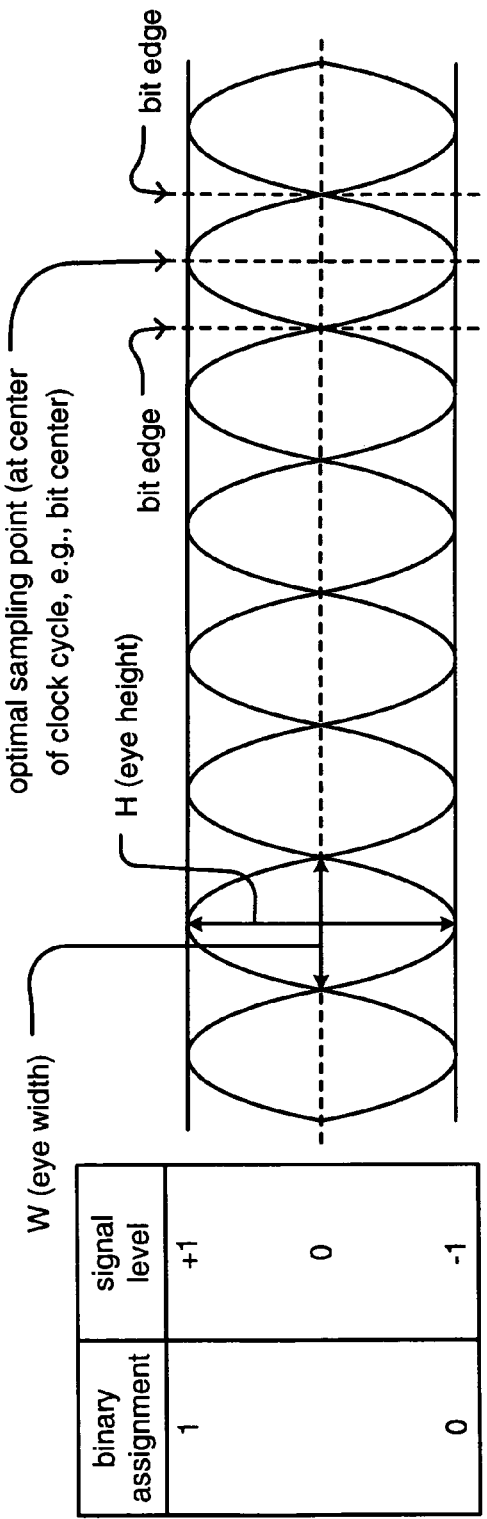

continuous time pulse response within a communication system

BC-ZFE (Bit-Center Zero Forcing Equalizer) signal shaping approach to send logical 1 eye diagram of BC-ZFE signal shaping approach showing relative location of ISI

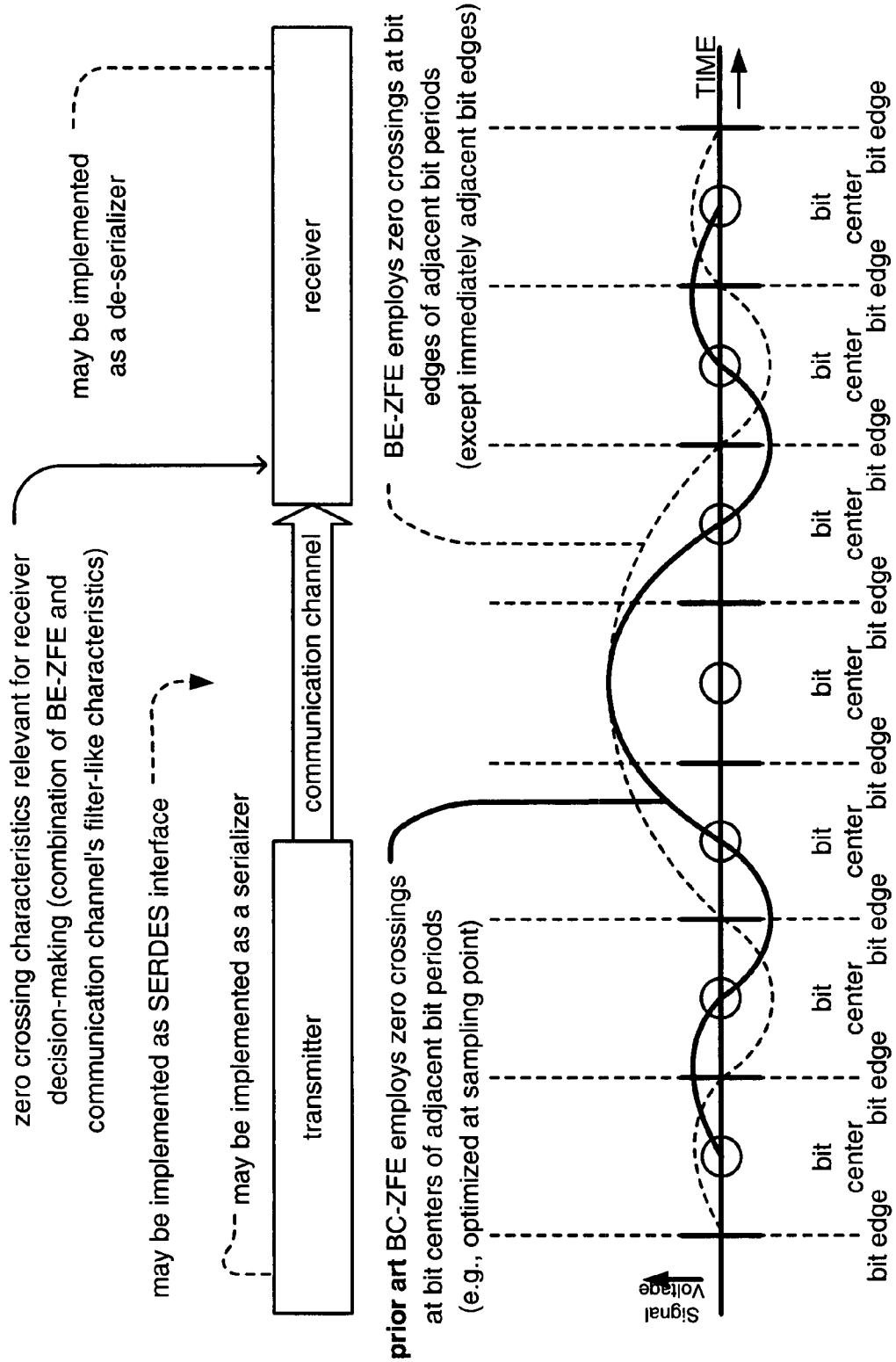

mapping of embodiment 1: BE-ZFE (takes pulse response values at bit edges and drives error to zero using mapping)

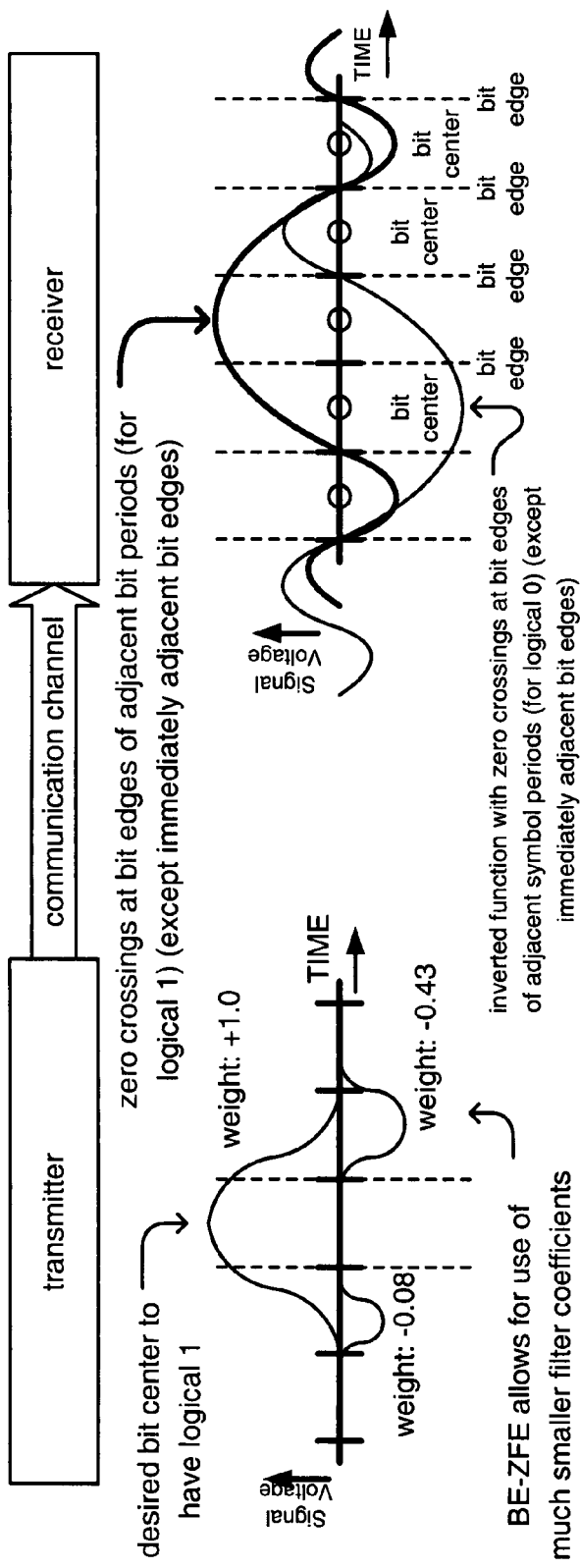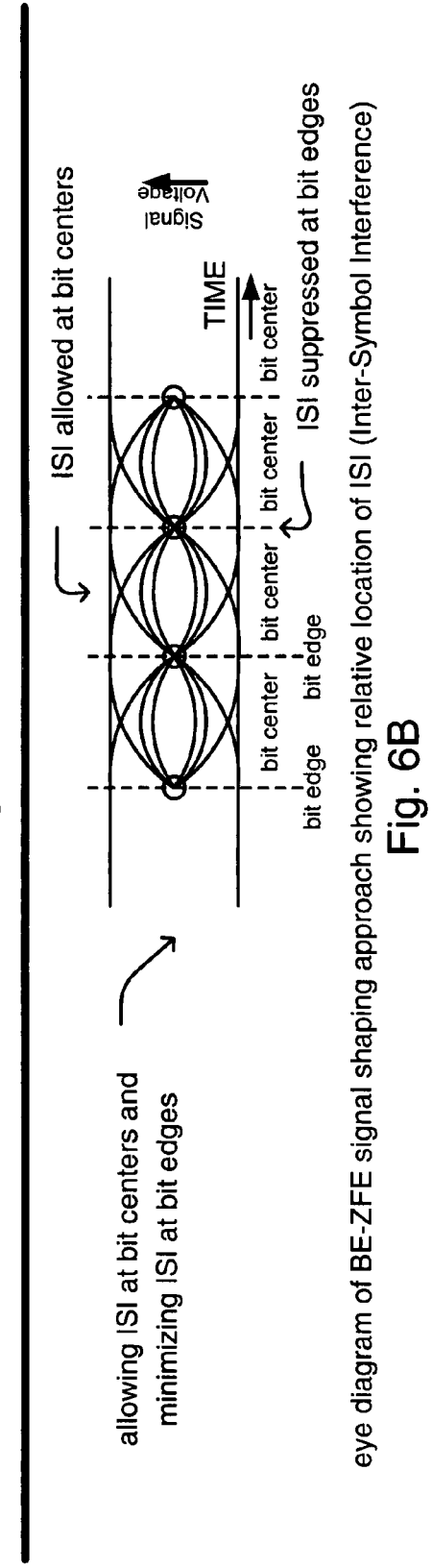

BE-ZFE implemented within transmitter of communication system

BE-ZFE implemented within receiver of communication system

BE-ZFE implemented part in transmitter and part in receiver of communication system method for performing equalization on a data signal according to Bit-Edge Zero Forcing Equalization

BIT-EDGE ZERO FORCING EQUALIZER

BACKGROUND OF THE INVENTION

1. Technical Field of the Invention

The invention relates generally to communication systems; and, more particularly, it relates to equalization that is performed on signals within such communication systems to assist in making more accurate decisions of data contained therein.

2. Description of Related Art

Data communication systems have been under continual development for many, many years. One very critical factor to assist in making proper decisions within digital communication systems is for a sampling point to have a relatively small amount of ISI (Inter-Symbol Interference). This ISI may be viewed as the deleterious effects resulting from one symbol interfering with those symbols adjacent to or near the symbol of interest within a sequence of symbols.

In a communication system that operates using 2 level signals (e.g. 1 and 0 in digital binary), oftentimes pulses are used to represent the logical 1 and 0 values. These 2 level communication systems are also sometimes referred to as polar data communication systems, or NRZ (Non-Return to Zero) communication systems, among other terminology. In such 2 level communication systems, a symbol may also be simply referred to as a bit, and a symbol period may also be referred to as a bit period. These bit periods are arranged in a sequence of bit periods such that each bit period has a bit center substantially located in the middle of the bit period and two bit edges that define the edge-interfaces between the bit period of interest (e.g. where the pulse of interest is located) and the adjacent bit periods.

In some communication systems, these pulses may undesirably interfere with one another as they are being transmitted across a communication channel from a transmitter to a receiver. This communication channel is most oftentimes responsible for causing these deleterious effects.

FIG. 1A is a diagram illustrating a prior art communication system whose communication channel introduces undesirable ISI (Inter-Symbol Interference) to pulses transmitted between a transmitter and a receiver. A pulse that is transmitted from a transmitter to a receiver via the communication channel unfortunately is warped, or spread, by the communication channel itself. In some respects, the communication channel may be viewed as being a filter that warps, or spreads, the transmitted pulse; the filter-like characteristics of the communication channel introduce a degree of attenuation and phase delay, that is non-uniform versus frequency, to the pulses transmitted there through.

Because of this warping, or spreading, of the transmitted pulses from a transmitter to a receiver across the communication channel, pulses that are located in relative close proximity with one another in the sequence of pulses (or sequence of bit periods) may interfere with one another and cause this undesirable ISI. It is also noted that the terminology of transmitter and receiver is used generally here to describe a first device that sends a signal to a second device. In light of this, the first and second devices may be of any number of types of communication devices (e.g. transceivers that include both transmitter and receiver functionality).

FIG. 1B is a diagram illustrating a representation of a sequence of random data of a NRZ (Non-Return to Zero)/2 level signal that can be found in the prior art. This diagram is provided to show the reader an example 2 level signal and the terminology used to describe the various portion of it. As can be seen in the diagram, the bit periods are arranged in a sequence such that the bit edges of any bit period line up with the bit edges of the adjacent bit edges. Ideally, the 2 level signal will have a signal value of either +1 or −1 at any given bit center. This bit center region is typically viewed as being the optimal sampling point within a bit period.

The vertical distance between the 2 levels to which the signal may vary is referred to as the eye height, H, and the horizontal distance between any two bit edges referred to as the eye width, W. While the actual signal values to which the signal varies are typically referred to as +1 or −1, the binary assignment of these values two values may be made as actual signal value +1 being assigned to a binary value of 1, and actual signal value −1 being assigned to a binary value of 0. The alternate binary assignment may also be made. For example, binary assignment of these values two values may be made as actual signal value +1 being assigned to a binary value of 0, and actual signal value −1 being assigned to a binary value of 1.

FIG. 2 is a diagram illustrating a prior art continuous time pulse response within a communication system. This diagram is provided to show how positive and negative valued pulses are sometimes employed to assist in ensuring that a zero crossing takes place at a particular location. A positive pulse and a negative pulse are provided from a transmitter to ensure that a zero crossing takes place precisely at a bit edge. This pulse sequence may be employed when a signal is to make a transition from one level of the 2 levels to the other level of the 2 levels. While this particular pulse sequence is shown as having a positive pulse followed by a negative pulse to generate a transition from the −1 signal level to the +1 signal level, but this pulse sequence could also be made in the opposite order as well.

Within such 2 level communication systems, there have been many efforts in the prior art to try to minimize these deleterious effects of ISI between the various bit periods. One approach has been to employ a prior art BC-ZFE (Bit-Center Zero Forcing Equalizer).

FIG. 3A is a diagram illustrating a prior art BC-ZFE (Bit-Center Zero Forcing Equalizer) signal shaping approach to send a logical 1. In this example, a combination of three separate pulses is employed to send a logical value of 1 (e.g., an actual signal value of +1). In this example, three pulses are all combined, and appropriately weighted according to the BC-ZFE approach, to generate a pulse that is to be transmitted from a transmitter to a receiver across the communication channel. The pulse that is to be transmitted is composed of one positively valued pulse and two separate negatively valued pulses. The relative weighting is +1.0 for the positively valued pulse, and −0.1 and −0.5, respectively, for the two separate negatively valued pulses. Each of these weighting values may be viewed as being filter tap coefficients within a BC-ZFE filter that is used in performing the operation of the BC-ZFE.

As can be seen in the diagram, the pulses are also shifted in time with respect to one another by one bit time (e.g., one bit period). This is known as symbol-spaced equalization to generate the desirable shaped pulse according to the BC-ZFE approach. When appropriately combined, these three pulses generate a pulse that is shaped according to a sinc function whose maximum value is appropriately located at the bit center of the bit period of interest, and the signal waveform also has zero crossings at the bit centers of the bit periods that are adjacent and neighboring the bit period of interest (e.g., the bit period in which the pulse is located). As is described in more detail below, the ISI of this generated signal waveform is minimized at the bit centers of the bit periods that are adjacent and neighboring the bit period of interest.

In the classic BC-ZFE, a pulse that is to be transmitted is shaped using a finite number of filter taps to modify the pulse into a sinc function (e.g., sinc(f) where f is frequency, and the sinc function is substantially centered at the bit center of the bit period of interest). The classic BC-ZFE takes the values of the pulse response at the bit centers of the adjacent and neighboring bit periods and drives the error terms associated therewith to zero.

The generation of the BC-ZFE filter tap coefficients may be performed as described below. Initially, the communication channel characteristic information, $H_{BC}$, is determined (as shown by the matrix below in this example as being the pulse response of a communication channel).

$$H_{BC} = \begin{pmatrix} 365 & 88 & 5 & 2 & 1 & 1 & 0 & 0 & 0 \\ 191 & 365 & 88 & 5 & 2 & 1 & 1 & 0 & 0 \\ 86 & 191 & 365 & 88 & 5 & 2 & 1 & 1 & 0 \\ 47 & 86 & 191 & 365 & 88 & 5 & 2 & 1 & 1 \\ 29 & 47 & 86 & 191 & 365 & 88 & 5 & 2 & 1 \\ 20 & 29 & 47 & 86 & 191 & 365 & 88 & 5 & 2 \\ 15 & 20 & 29 & 47 & 86 & 191 & 365 & 88 & 5 \\ 11 & 15 & 20 & 29 & 47 & 86 & 191 & 365 & 88 \\ 9 & 11 & 15 & 20 & 29 & 47 & 86 & 191 & 365 \end{pmatrix}$$

This communication channel characteristic information, $H_{BC}$, may be viewed as any number of things including the interference of the communication channel, the SNR (Signal to Noise Ratio) of the communication channel, the number of users of the communication channel, and also other operational characteristics of the communication channel. Once the communication channel characteristic information, $H_{BC}$, has been determined, then the errors associated with the bit centers of the bit periods that are adjacent and neighboring the bit period of interest are addressed.

According to the prior art approach provided by the BC-ZFE, the metric that is employed to minimize the undesirable ISI is based on what is widely deemed to be the optimal sampling point of a bit period, namely, the bit centers of the bit periods. That is to say, the classical BC-ZFE approach looks only at the bit centers (e.g., the centers of the bit time periods) to generate the error correction metric. The prior art approach employs this BC-ZFE approach to any manner in which it is implemented. For example, whether it is a feedback or feedforward implementation, the classic BC-ZFE approach is implemented only to minimize the ISI substantially at the bit centers of the bit periods.

These error portions (at the bit centers of those bit periods) are referenced by the BC-ZFE pulse mapping vector, $h_{BC}$, that is shown as follows:

$$h_{BC} = \begin{pmatrix} 0 \\ 0 \\ 0 \\ 0 \\ 0 \\ 1 \\ 0 \\ 0 \\ 0 \\ 0 \end{pmatrix}$$

A filter having a finite number of filter taps may be employed to implement a prior art BC-ZFE. The BC-ZFE filter tap coefficients, $H_{BC-ZFE}$, may be calculated by taking the inverse of the communication channel characteristic information, $H_{BC}$, multiplied by the BC-ZFE pulse mapping vector, $h_{BC}$. If desired, this resultant may undergo normalization as well. This process of calculating the BC-ZFE filter tap coefficients, $H_{BC-ZFE}$, is shown below.

$$H_{BC-ZFE} = H_{BC}^{-1} \cdot h_{BC} \cdot \left(\frac{1000}{3.606}\right)$$

Using the values shown above for the communication channel characteristic information, $H_{BC}$, and for the BC-ZFE pulse mapping vector, $h_{BC}$, the BC-ZFE filter tap coefficients, $H_{BC-ZFE}$, are in the vector below. The calculation of the BC-ZFE filter tap coefficients, $H_{BC-ZFE}$, may be described mathematically as follows.

$$H_{BC-ZFE} = \begin{pmatrix} 0.003 \\ -0.017 \\ 0.060 \\ -0.263 \\ 1.000 \\ -0.480 \\ 0.051 \\ -0.023 \\ -0.005 \end{pmatrix}$$

FIG. 3B is a diagram illustrating a prior art eye diagram of a BC-ZFE signal shaping approach showing the relative location of ISI therein. As can be seen, by optimizing to the sampling points of the bit periods (e.g., the bit centers of the bit periods), the ISI is in fact substantially eliminated (or at least substantially minimized) at those respective bit centers. However, one of the most undesirable deleterious effects of this prior art BC-ZFE approach is that there still can be very significant ISI at the non-bit center locations within the respective bit periods. Generally speaking, the ISI can go along virtually any trajectory or path between the zero forced ISI locations at the bit centers of the corresponding bit periods.

It is pointed out that the value at the bit center of any bit period is reduced to be just one of 2 separate values (e.g., +1 or −1). This classic prior art BC-ZFE approach is an optimal condition in the presence of a magnitude (or an amplitude) noise limited system. Amplitude noise will represent a distribution on each of the +1 or −1 values. Errors are minimized when these two distributions are spaced as far apart as possible. Although an increased gain may be employed to separate the +1 and −1 values, such an increase in gain also comes with an increase in the noise so there is oftentimes no overall benefit in doing so. It can be seen that there is only an indirect reduction in the phase jitter. While the amplitude noise reduction approach provided by the BC-ZFE may be appropriate for some applications, it does not necessarily fare well for jitter noise limited systems. For example, a BC-ZFE can leave considerable phase jitter which is inherently a significant problem for phase noise limited communication systems.

This sometimes very large ISI at the other locations within the bit periods besides the bit centers can incur a heavy cost in terms of performance. For example, this undesirable ISI can be very difficult to deal with when actually implementing a BC-ZFE within a communication device (e.g., in hardware). For example, in very high-speed data links (one example being: 10 Gbps (Giga-bits per second) over 24 inches of an FR4 communication channel, which is at the further edge of the state of the art in 2004) using practical clock generation technology, the jitter on a sampling clock can be a significant portion of a bit period. A secondary issue is a relatively significant number of filter taps are often required to implement a BC-ZFE effectively. In some instances, as many as 5 or 7 filter taps are required to get the ISI down to a sufficiently low level at the bit centers of the bit periods that are adjacent and neighboring the bit period of interest. To build a device having this many filter taps inherently requires a large device with many functional blocks included therein. Moreover, not only must a BC-ZFE often have a significant number of filter taps, but the coefficient values that correspond to those filter taps are relatively large in value. These relatively large filter tap coefficient values require functional blocks within the communication device that can deliver relatively large drive currents.

The combined effect of requiring many filter taps along with the relatively large filter tap coefficient values, thereby requiring devices with larger components therein, can often result in a communication device that does not always meet design operational criterion. For example, the relatively large size of the communication device can result in significant parasitic loading because of the increased parasitic capacitance of the relatively large device. Also, because so many filter taps are often required, a relatively high number of high speed delay elements is often required. These high speed delay elements can require a significant degree of buffering and clock signaling. These are but some of the many deleterious effects that can be incurred when using a prior art classic BC-ZFE approach to signal shaping. As such, there is a need in the art for a better way in which equalization may be performed to assist in signal shaping so that accurate decision making may be made at a receiver end of a communication channel of the information bits transmitted thereto.

BRIEF SUMMARY OF THE INVENTION

Various aspects of the invention can be found in various embodiments of a BE-ZFE (Bit-Edge Zero Forcing Equalizer). An exemplary embodiment of the BE-ZFE includes a filter tap coefficient module that provides filter tap coefficients. The BE-ZFE also includes a filter that includes a finite number of filter taps such that each filter tap is adjusted according to one filter tap coefficient. The filter and a communication channel modifies a pulse, wherein the modified pulse is located within a sequence of bit periods. The modified pulse has zero crossings located substantially at bit edges of each bit period within the sequence of bit periods except those bit edges immediately adjacent to the bit period in which the original pulse is substantially located. In an alternative embodiment, the modified pulse has zero crossings located substantially at bit edges of each bit period within the sequence of bit periods including those bit edges immediately adjacent to the bit period in which the pulse is substantially located.

In certain embodiments, the filter tap coefficient module calculates the filter tap coefficients in real time based on currently updated characteristic information of a communication channel that communicatively couples a transmitter and a receiver. Alternatively, the filter tap coefficient module may calculate the filter tap coefficients offline based on predetermined characteristic information of a communication channel that communicatively couples a transmitter and a receiver. The filter tap coefficient module can employ an inverse of a communication channel transfer function and a pulse mapping to calculate the filter tap coefficients. In some instances, the filter tap coefficients may be selected such that the absolute values of each filter tap coefficient add up to be substantially equal to one.

Given the shaping of the pulse that is to be transmitted, the modified pulse substantially minimizes ISI (Inter-Symbol Interference) at bit edges of each bit period within the sequence of bit periods except those bit edges immediately adjacent to the bit period in which the pulse is substantially located, and the modified pulse allows a portion of ISI to exist at bit centers of each bit period within the sequence of bit periods except the bit period in which the pulse is substantially located.

The filter may be implemented to include relatively fewer filter taps than is required within a classical prior art filter. For example, the filter may be implemented to include as few as 3 filter taps that are adjusted according to 3 corresponding filter tap coefficients.

The BE-ZFE may be implemented within any number of communication devices within any number of different types of communication systems. For example, the BE-ZFE may be implemented within a transmitter that is communicatively coupled to a receiver via a communication channel. Alternatively, the BE-ZFE may be implemented within a receiver that is communicatively coupled to a transmitter via a communication channel. In even another embodiment, the BE-ZFE may be implemented in a distributed manner part in a transmitter and part in a receiver, and the transmitter and the receiver are communicatively coupled via a communication channel. The BE-ZFE may be implemented in either symbol-spaced or fractionally-spaced equalization systems as well without departing from the scope and spirit of the invention.

The invention envisions any type of devices that supports the functionality and/or processing described herein. Moreover, various types of methods may be performed to support the functionality described herein without departing from the scope and spirit of the invention.

BRIEF DESCRIPTION OF THE SEVERAL VIEWS OF THE DRAWINGS

FIG. 1A is a diagram illustrating a prior art communication system whose communication channel introduces undesirable ISI (Inter-Symbol Interference) to pulses transmitted between a transmitter and a receiver.

FIG. 1B is a diagram illustrating a representation of a sequence of random data of a NRZ (Non-Return to Zero)/2 level signal that can be found in the prior art.

FIG. 4 is a diagram illustrating an embodiment of a BE-ZFE (Bit-Edge Zero Forcing Equalizer) that does not include forcing immediately adjacent bit edges to zero according to aspects of the invention.

FIG. 6A is a diagram illustrating an embodiment of a BE-ZFE (Bit-Edge Zero Forcing Equalizer) signal shaping approach to send a logical 1 according to aspects of the invention.

FIG. 6B is a diagram illustrating an embodiment of an eye diagram of a BE-ZFE signal shaping approach showing the relative location of ISI therein according to aspects of the invention.

DETAILED DESCRIPTION OF THE INVENTION

Figure 2:
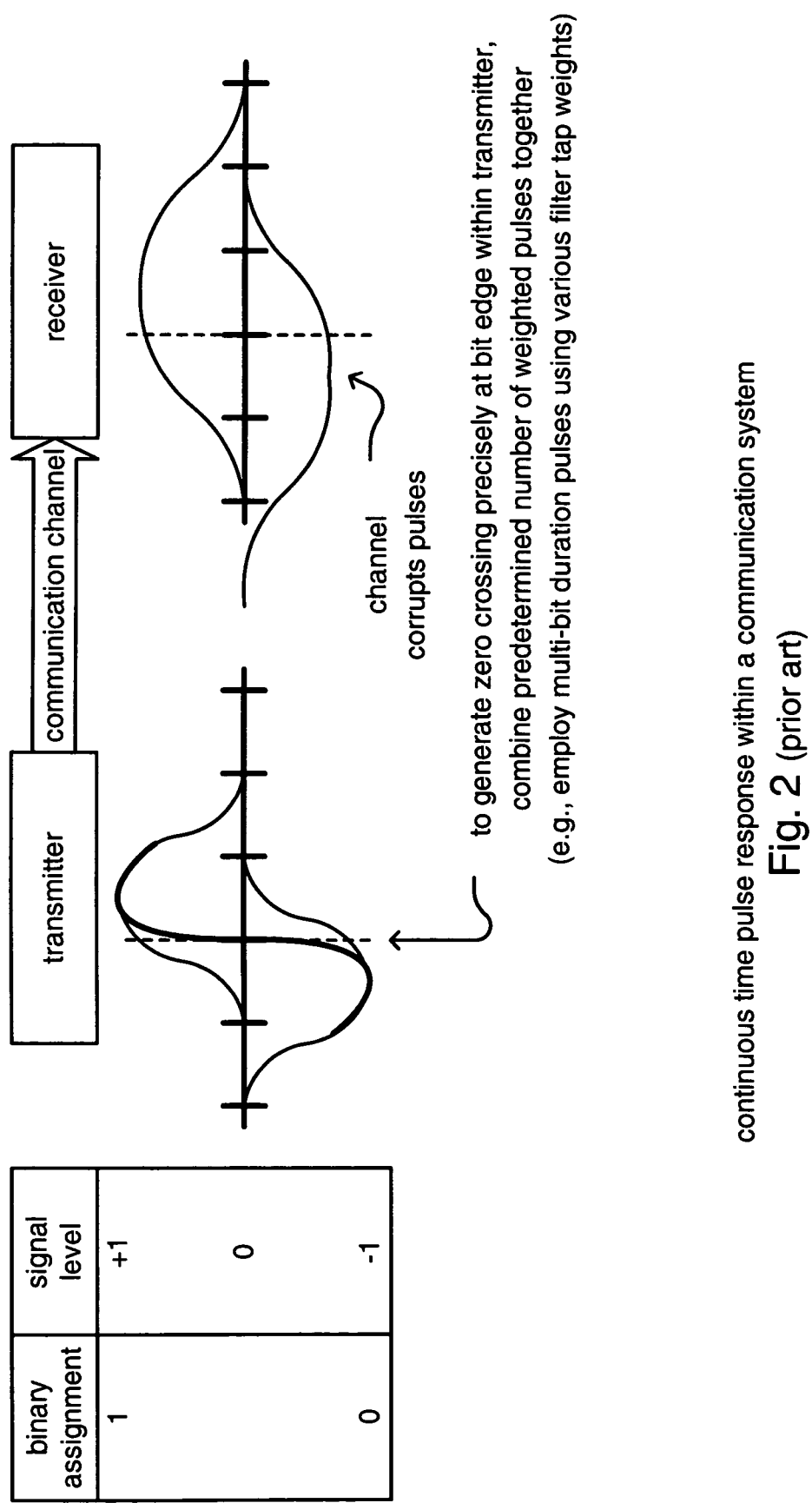
FIG. 2 is a diagram illustrating a prior art continuous time pulse response within a communication system.

A novel approach is presented whereby equalization is performed on a signal that contains data (e.g., information bits) to improve the probability of making an accurate decision on data contained within that data signal at a receiver end of a communication channel. This new approach of equalization may be performed using a BE-ZFE (Bit-Edge Zero Forcing Equalizer) as described herein. In a most general description, the BE-ZFE performs equalization by looking at the values of data that occur at the bit edges of a data signal and seeks to drive those associated error terms to zero. This new BE-ZFE approach is a significant departure from the classical prior art BC-ZFE (Bit-Center Zero Forcing Equalizer) approach that looks specifically at the values of the signal at the bit centers and seeks to drive those associated error terms to zero.

In contradistinction to the prior art BC-ZFE approach, the new BE-ZFE approach looks specifically at the values of the signal at the bit edges and seeks to drive those associated error terms to zero. This may be implemented in at least one of two different ways. In one embodiment, the BE-ZFE approach may be implemented such that zero crossings are maintained at bit edges of the adjacent bit periods and neighboring bit periods except for those bit edges immediately adjacent to the bit period of interest in which the pulse of interest in substantially located. In other words, the bit edges of each bit period (or symbol period) is maintained to have a zero crossing, and the bit edges immediately adjacent to the bit period in which the pulse of interest is located are not forced to zero. In an alternatively embodiment, the BE-ZFE approach may be implemented such that zero crossings are maintained at bit edges of all bit periods including those bit edges immediately adjacent to the bit period of interest in which the pulse of interest in substantially located.

It is also noted here that the BE-ZFE approach may be employed within a very wide variety of communication systems. For example, any digital communication system that involves a transmitter communicatively coupled to a receiver via a communication channel across which data are sent may benefit from the various aspects of the BE-ZFE as describe herein. Some examples of communication systems that may benefit from the BE-ZFE include high speed serial communication applications. One such interface is implemented as a SERDES (SERializer DESerializer) in which a serializer converts parallel based data to a serial data stream for transmission across a serial communication link to a deserializer that re-converts the serial data stream back to parallel formatted data. Any communication system in which the signal properties (e.g., eye height and eye width) are deteriorated during transmission through the communication channel may benefit from the BE-ZFE as described herein. The BE-ZFE can greatly enhance the ability to detect the actual bit values of a data signal even in the presence of a significant amount of media noise, crosstalk, and other deleterious effects. Other application areas that may benefit from the BE-ZFE as described herein include serial backplane and chip-to-chip communications, emerging high speed video communications, PCI (Peripheral Component Interconnect) bus, 10 G Ethernet, and Fiberchannel.

Moreover, it is noted that the BE-ZFE is appropriate for application within communication systems that are characteristically phase noise (or jitter) limited communication systems. The prior art BC-ZFE, in contradistinction, is more appropriate for amplitude noise limited communication systems. However, very high speed serial links are typically found in more phase noise limited communication systems, and as such, the new BE-ZFE is more appropriate for such communication systems. The BE-ZFE may also be implemented within communication systems that operate as feedback or feedforward systems without departing from the scope and spirit of the invention.

Another benefit that is provided by the BE-ZFE system is that it can operate using signals of smaller bandwidth (e.g., lower frequency pulses) than is required within a classical prior art BC-ZFE system. This smaller bandwidth also allows the use of smaller valued coefficients on the corresponding BE-ZFE filter taps (as described in more detail below).

FIG. 4 is a diagram illustrating an embodiment of a BE-ZFE (Bit-Edge Zero Forcing Equalizer) that does not include forcing immediately adjacent bit edges to zero according to aspects of the invention. As can be seen when comparing the zero crossings of the signal shaped by the classical prior art BC-ZFE to the zero crossings of the signal shaped by the new BE-ZFE, the zero crossings of the new BE-ZFE coincide with the bit edges of the bit periods that are adjacent and neighboring the bit period of interest (e.g., the bit period in which the pulse is located) except for the bit edges immediately adjacent to the bit period in which the pulse is located. The ISI is substantially minimized to zero at each of those respective bit centers.

Below, various embodiments are described in greater detail by which a BE-ZFE may be implemented in a transmitter, in a receiver, or in a distributed manner between transmitter and receiver. However, regardless of how and where the BE-ZFE is being implemented within a communication system, the BE-ZFE equalization operates in combination with the filter-like signal shaping performed by the communication channel to ensure that zero crossings occur at the bit edges of the signal so that more accurate decision making may be made at the receiver end of the communication channel of any information bits transmitted through the communication channel.

Figure 5A:
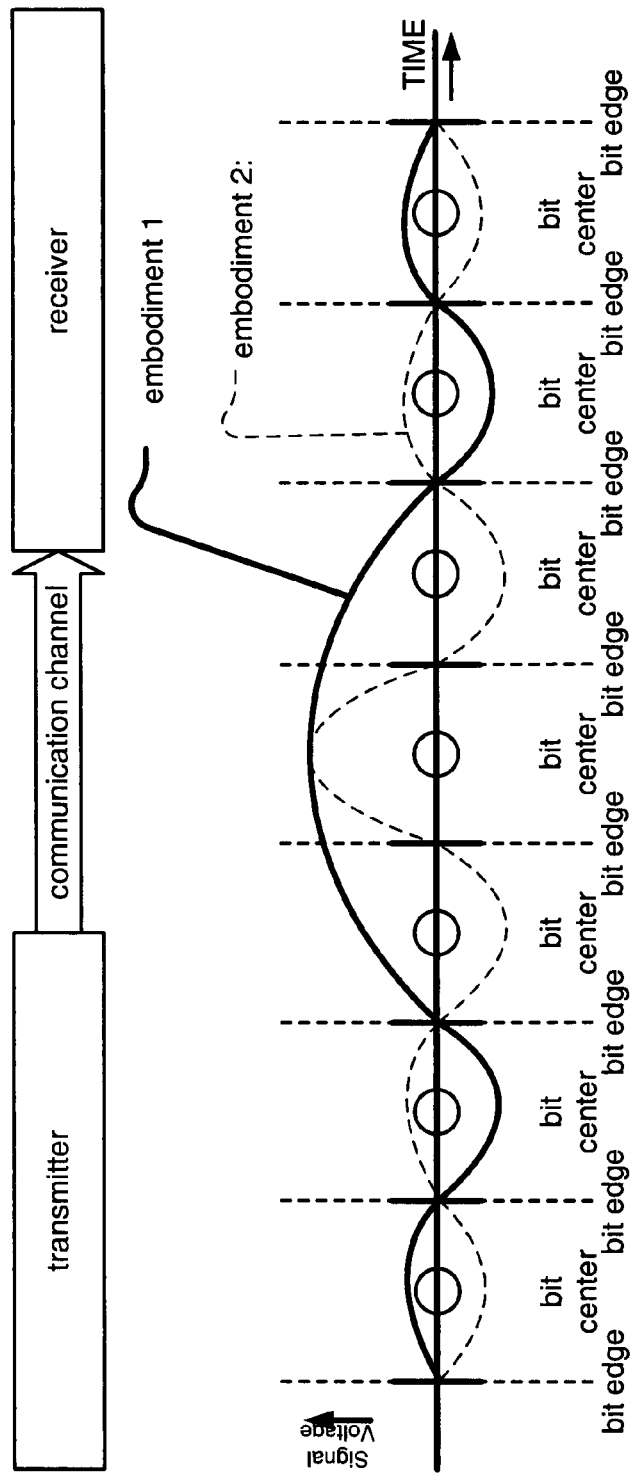
FIG. 5A is a diagram illustrating two possible embodiments of a BE-ZFE (Bit-Edge Zero Forcing Equalizer) according to aspects of the invention.

FIG. 5A is a diagram illustrating two possible embodiments of a BE-ZFE (Bit-Edge Zero Forcing Equalizer) according to aspects of the invention. The embodiment 1 waveform shown in this diagram is similar to that embodiment shown above within the FIG. 4, in that, the zero crossings of the new BE-ZFE coincide with the bit edges of the bit periods that are adjacent and neighboring the bit period of interest (e.g., the bit period in which the pulse is located) except for the bit edges immediately adjacent to the bit period in which the pulse is located. The waveform of embodiment 1 shown in FIG. 5A is the result of a pulse input into a BE-ZFE filter plus channel combination. Thus if the BE-ZFE filter (see FIG. 7) is at the transmitter, then the embodiment 1 waveform is at the receiver after the channel. However, in another embodiment if the BE-ZFE filter is at the receiver, then the embodiment 1 waveform is the output of the channel plus BE-ZFE filter combination.

The embodiment 2 is an alternative embodiment in which the zero crossings are also forced at the immediately adjacent bit edges of the bit period in which the pulse is located. As such, the positive/negative signal values of the signal waveforms generated by the embodiment 1 and the embodiment 2 are opposite in sign all of the bit periods except for the bit period in which the pulse is located. Each of the embodiment 1 and the embodiment 2 of the BE-ZFE shown herein can be implemented using a filter having a finite number of taps. Any BE-ZFE by which a pulse to be transmitted may be modified to have either one of the characteristics shown herein may be viewed as lying within the scope and spirit of the invention. Some ways by which BE-ZFE filter tap coefficients may be calculated to adjust the taps of a BE-ZFE filter to perform this signal shaping of a pulse are presented below.

Figure 5B:
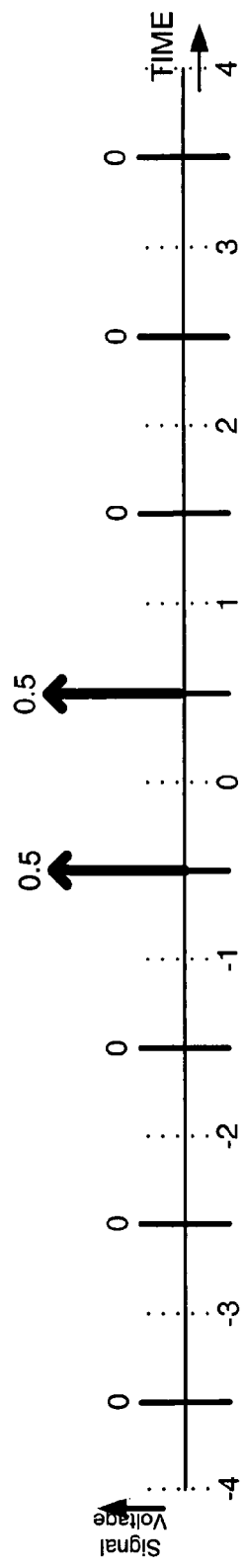
FIG. 5B is a diagram illustrating a BE-ZFE pulse mapping of embodiment 1 (that is shown in FIG. 5A) according to aspects of the invention.

FIG. 5B is a diagram illustrating a BE-ZFE pulse mapping of embodiment 1 (that is shown in FIG. 5A) according to aspects of the invention. The generation of the BE-ZFE filter tap coefficients may be performed as described below. Initially, the communication channel characteristic information, $H_{BE}$, is determined (as shown by the vector below).

$$H_{BE} = (14\ 18\ 26\ 40\ 66\ 135\ 310\ 241\ 11)$$

Similar to the communication channel characteristic information presented above with respect to the prior art BC-ZFE, $H_{BC}$, the communication channel characteristic information with respect to the new BE-ZFE, $H_{BE}$, may also be viewed as being any number of things including the interference of the communication channel, the SNR of the communication channel, the number of users of the communication channel, and also other operational characteristics of the communication channel. Once the communication channel characteristic information, $H_{BE}$, has been determined, then the errors associated with the bit centers of the bit periods that are adjacent and neighboring the bit period of interest are addressed.

According to the new approach provided by the BE-ZFE, the metric that is employed to minimize the undesirable ISI is based on the bit edges of the various bit periods. That is to say, this new BE-ZFE approach looks specifically at the bit edges (e.g., the edges of the bit time periods) to generate the error correction metric. Moreover, whether a communication system is implemented as a feedback or feedforward implementation, the new BE-ZFE approach is implemented to minimize the ISI substantially at the bit edge of the various bit periods.

These error portions (at the bit edges of those bit periods) are referenced by the BE-ZFE pulse mapping vector, $h_{BE}$, that is shown as follows (and is also shown pictorially in the FIG. 5B):

$$h_{BE} = \begin{pmatrix} 0 \\ 0 \\ 0 \\ 0 \\ 0.5 \\ 0.5 \\ 0 \\ 0 \\ 0 \end{pmatrix}$$

A filter having a finite number of filter taps may be employed to implement this new BE-ZFE. The BE-ZFE filter tap coefficients, $H_{BE-ZFE}$, may be calculated using an iterative minimum-error gradient search approach. Alternatively, $H_{BE-ZFE}$ may be calculated by taking the inverse of the communication channel characteristic information, $H_{BE}$, and multiplying it by the BE-ZFE pulse mapping vector, $h_{BE}$. If desired, this resultant may also undergo normalization as well. This process of calculating the BE-ZFE filter tap coefficients, $H_{BE-ZFE}$, is shown below.

$$H_{BE-ZFE} = H_{BE}^{-1} \cdot h_{BE}$$

Using the values shown above for the communication channel characteristic information, $H_{BE}$, and for the BE-ZFE pulse mapping vector, $h_{EC}$, the BE-ZFE filter tap coefficients, $H_{BE-ZFE}$, are in the vector below. The final result of the calculated BE-ZFE filter tap coefficients, $H_{BE-ZFE}$, is shown as follows:

$$H_{BC-ZFE} = \begin{pmatrix} 0.000 \\ 0.001 \\ 0.001 \\ -0.080 \\ 1.000 \\ -0.430 \\ -0.011 \\ -0.026 \\ -0.006 \end{pmatrix}$$

Upon closer inspection of the individual coefficient values within the vector of the calculated BE-ZFE filter tap coefficients, $H_{BE-ZFE}$, it can be seen that there are only 3 BE-ZFE filter tap coefficients values of any real significance within a finite precision system. As such, an even greater savings can be made in terms of processing hardware and complexity by truncating the vector of the calculated BE-ZFE filter tap coefficients, $H_{BE-ZFE}$, to include only the 3 most significant BE-ZFE filter tap coefficients, namely, the 3 center BE-ZFE filter tap coefficients. This truncated vector, $H_{BE-ZFE(truncated)}$, that only includes the 3 most significant BE-ZFE filter tap coefficients is shown below.

$$H_{BC-ZFE(truncated)} = \begin{pmatrix} 0.000 \\ 0.000 \\ 0.000 \\ -0.080 \\ 1.000 \\ -0.430 \\ 0.000 \\ 0.000 \\ 0.000 \end{pmatrix}$$

As can be seen when comparing the magnitude of these calculated BE-ZFE filter tap coefficients, $H_{BE-ZFE}$, to the magnitudes of the classical prior art BC-ZFE filter tap coefficients, $H_{BC-ZFE}$, shown above, the magnitude of the BE-ZFE filter tap coefficients are relatively smaller that the magnitude of the prior art BC-ZFE filter tap coefficients. Moreover, there are significantly fewer BE-ZFE filter tap coefficients (3) than there are BC-ZFE filter tap coefficients (compared to 9). By providing for a means by which far fewer filter taps and reduced BE-ZFE filter tap coefficient values can be employed while still substantially minimizing undesirable ISI within a pulse that is to be transmitted, a much smaller device can be employed having fewer filter taps, fewer high speed delay elements, less parasitic loading (thanks to the smaller device size), and even better performance. Such a device employing a BE-ZFE even consumes less energy thanks to these various improvements when compared to a classical prior art BC-ZFE.

It is also noted that the signal waveform generated by the new BE-ZFE is not necessarily a sinc function as is the signal waveform generated by the classical prior art BC-ZFE.

Figure 3A:
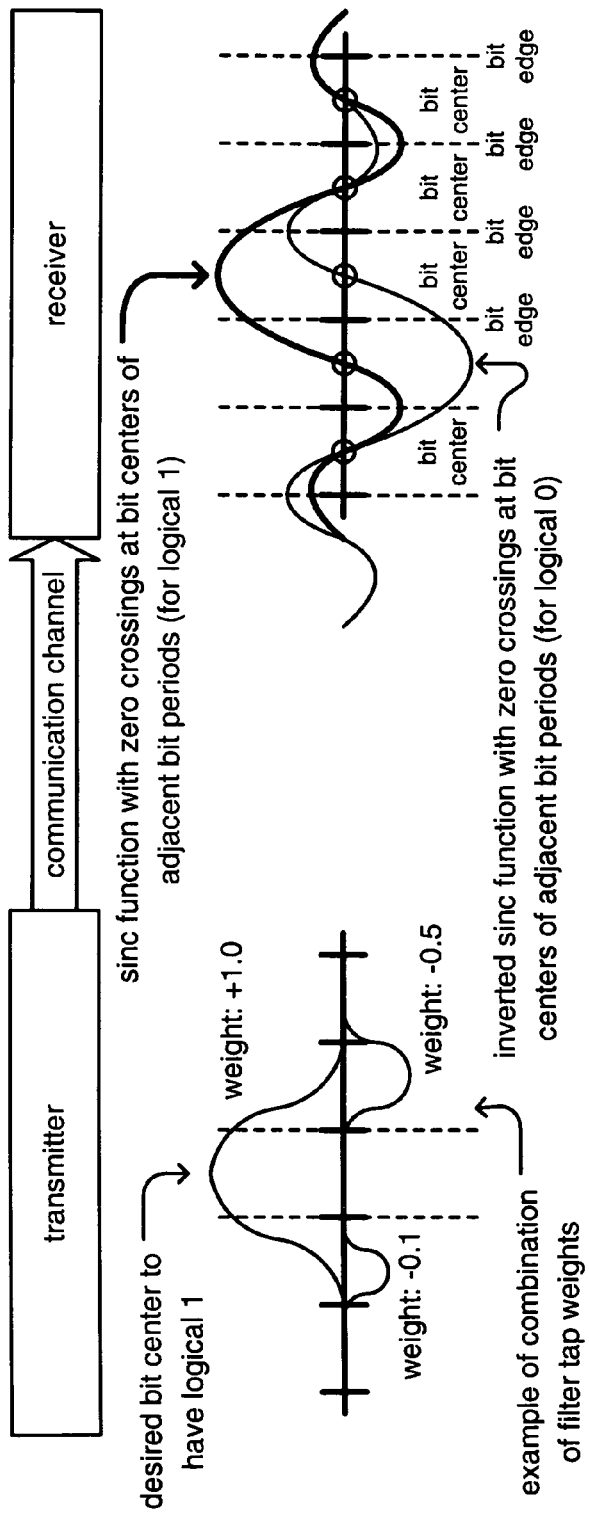
FIG. 3A is a diagram illustrating a prior art BC-ZFE (Bit-Center Zero Forcing Equalizer) signal shaping approach to send a logical 1.
Figure 3B:
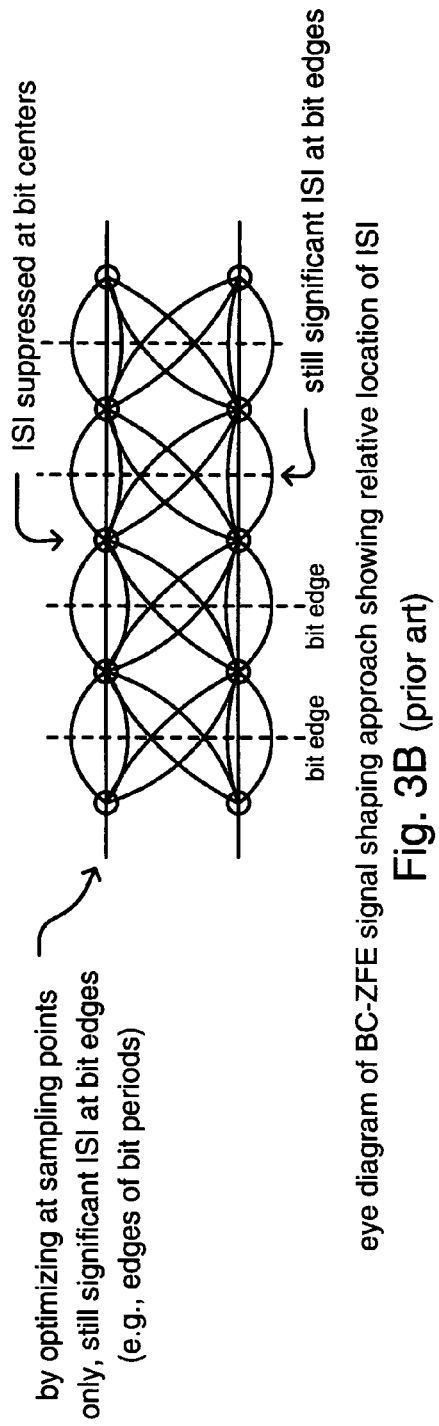
FIG. 3B is a diagram illustrating a prior art eye diagram of a BC-ZFE signal shaping approach showing the relative location of ISI therein.

FIG. 6A is a diagram illustrating an embodiment of a BE-ZFE (Bit-Edge Zero Forcing Equalizer) signal shaping approach to send a logical 1 according to aspects of the invention. This diagram is relatively analogous to the diagram of the FIG. 3A described and shown above; however, the new BE-ZFE can be implemented using relatively smaller coefficients than are required by the classical prior art BC-ZFE.

In this example, a combination of three separate pulses is employed to send a logical value of 1 (e.g., an actual signal value of +1). In this example, three pulses are all combined, and appropriately weighted according to the BE-ZFE approach, to generate a pulse that is to be transmitted from a transmitter to a receiver across the communication channel. The pulse that is to be transmitted is composed of one positively valued pulse and two separate negatively valued pulses. The relative weighting is +1.0 for the positively valued pulse, and −0.08 and −0.43, respectively, for the two separate negatively valued pulses. Each of these weighting values may be viewed as being filter tap coefficients within a BE-ZFE filter that is used in performing the operation of the BE-ZFE. Again, these BE-ZFE filter tap coefficients are relatively much smaller in value than the BC-ZFE filter tap coefficients employed by a prior art BC-ZFE.

FIG. 6B is a diagram illustrating an embodiment of an eye diagram of a BE-ZFE signal shaping approach showing the relative location of ISI therein according to aspects of the invention. As can be seen, by optimizing to the bit edges of the bit periods, the ISI is in fact substantially eliminated (or at least substantially minimized) at those respective bit edges. However, a certain degree of ISI is still allowed to exist within the bit centers of the respective bit periods. One interesting overall performance improvement provided by the BE-ZFE when compared to the classical prior art BC-ZFE is that even though ISI is allowed to exist within the bit centers of the various bit periods within a BE-ZFE system, there is a greater overall reduction in ISI within a BE-ZFE system than in a classical prior art BC-ZFE system.

Figure 7:
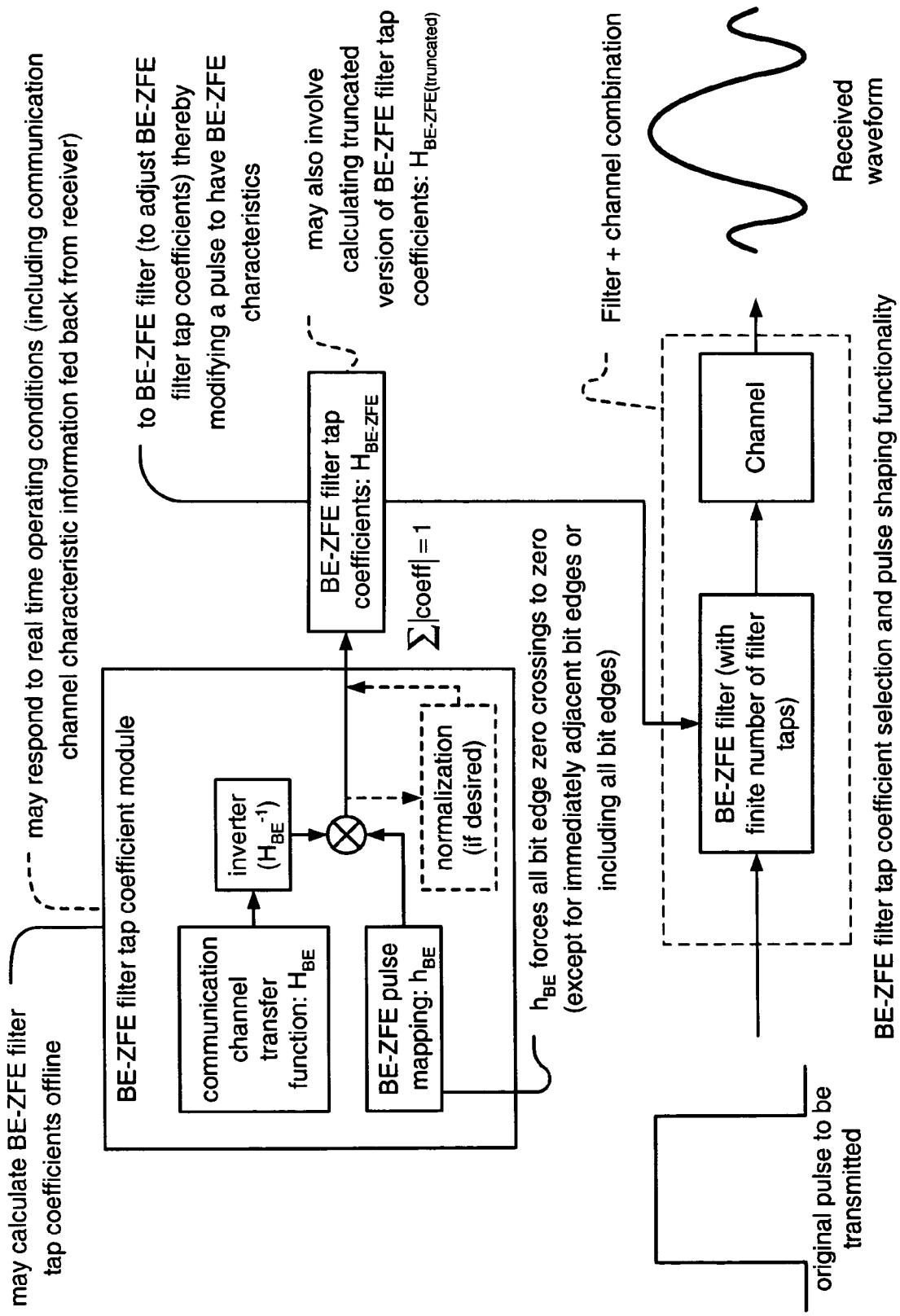
FIG. 7 is a diagram illustrating an embodiment of BE-ZFE filter tap coefficient selection and pulse shaping functionality according to aspects of the invention.

FIG. 7 is a diagram illustrating an embodiment of BE-ZFE filter tap coefficient selection and pulse shaping functionality according to aspects of the invention. A BE-ZFE filter tap coefficient module provides BE-ZFE filter tap coefficients to a BE-ZFE filter. The BE-ZFE filter tap coefficient module may alternatively provide the truncated version of the BE-ZFE filter tap coefficients to the BE-ZFE filter. The BE-ZFE filter includes a finite number of filter taps such that each filter tap is adjusted according to one of the BE-ZFE filter tap coefficients provided by the BE-ZFE filter tap coefficient module.

FIG. 7 shows an example of an original pulse, which is input into the BE-ZFE filter plus channel combination. The output is the received waveform as shown in FIG. 5A. In one embodiment the BE-ZFE filter is at the transmitter. In another embodiment (not shown) the BE-ZFE filter is at the receiver and the channel comes before the BE-ZFE filter in the BE-ZFE filter plus channel combination.

It is noted that the BE-ZFE filter tap coefficient module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The edge detection module may employ a memory that may be a single memory device or a plurality of memory devices. Such a memory device may be a ROM (Read-Only Memory), RAM (Random Access Memory), volatile memory, non-volatile memory, static memory, dynamic memory, flash memory, and/or any device that stores digital information. It is also noted that when the BE-ZFE filter tap coefficient module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory stores, and the BE-ZFE filter tap coefficient module executes operational instructions corresponding to at least some of the steps and/or functions herein.

The BE-ZFE filter tap coefficient module may calculate the BE-ZFE filter tap coefficients offline based on predetermined communication channel characteristic information that is provided to the BE-ZFE filter tap coefficient module based on an offline assessment of the communication channel characteristic information. Alternatively, the BE-ZFE filter tap coefficient module may calculate the BE-ZFE filter tap coefficients in real time based on the current operating conditions of the communication system in which a communication device including the BE-ZFE is implemented. For example, when the BE-ZFE is implemented within a transmitter within a communication system, then a feedback signal path from a receiver to which the transmitter is communicatively coupled via a communication channel may provide information concerning the current operating conditions of the communication system including the currently updated communication channel characteristic information.

Initially, the communication channel characteristic information, $H_{BE}$, or communication channel transfer function, is determined. This communication channel characteristic information, $H_{BE}$, is then inverted thereby generating, $H_{BE}^{-1}$. In addition, the BE-ZFE pulse mapping vector, $h_{BE}$, that forces all bit edges to zero crossings (in either the embodiment 1 or the embodiment 2 approach shown above within the FIG. 5A, is multiplied by the inverted communication channel characteristic information, $H_{BE}^{-1}$, to provide the BE-ZFE filter tap coefficients, $H_{BE\text{-}ZFE}$. Mathematically, this functionality is shown below.

$$H_{BE\text{-}ZFE} = H_{BE}^{-1} \cdot h_{BE}$$

Again, these BE-ZFE filter tap coefficients may be calculated by the BE-ZFE filter tap coefficient module in real time, or these BE-ZFE filter tap coefficients may be determined offline. Regardless of how they are calculated, the BE-ZFE filter tap coefficients are provided from the BE-ZFE filter tap coefficient module to the BE-ZFE filter to adjust the individual filter taps values therein. The BE-ZFE filter modifies a pulse that is substantially located within a bit period that is located within a sequence of bit periods. The modified pulse has zero crossings located substantially at bit edges of each bit period within the sequence of bit periods except those bit edges immediately adjacent to the bit period in which the pulse is substantially located; this embodiment may be viewed as being the embodiment 1 shown and described above with respect to the FIG. 5A. Alternatively, the modified pulse may be implemented such that it has zero crossings located substantially at bit edges of each bit period within the sequence of bit periods including those bit edges immediately adjacent to the bit period in which the pulse is substantially located; this embodiment may be viewed as being the embodiment 2 shown and described above with respect to the FIG. 5A.

The BE-ZFE filter tap coefficient module and the BE-ZFE filter may be viewed as being elements of a BE-ZFE that is implemented according to aspects of the invention. Such a BE-ZFE may be implemented within any number of communication devices within any number of different types of communication systems.

Figure 8A:
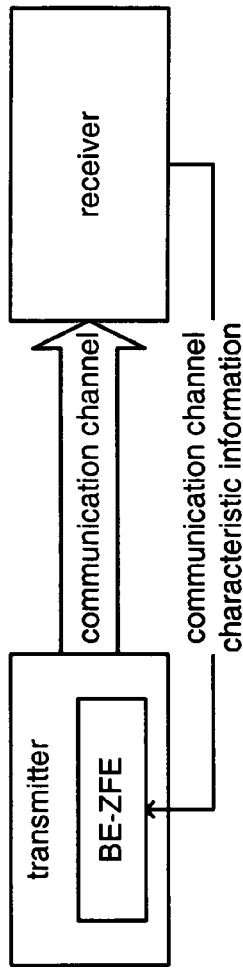
FIG. 8A is a diagram illustrating an embodiment of a BE-ZFE implemented within a transmitter of a communication system according to aspects of the invention.

FIG. 8A is a diagram illustrating an embodiment of a BE-ZFE implemented within a transmitter of a communication system according to aspects of the invention. This embodiment shows how a BE-ZFE may be implemented within a transmitter that is communicatively coupled to a receiver within a communication system. In some instances, a feedback signal is provided from the receiver to the transmitter to provide for updated communication channel characteristic information. This way, the BE-ZFE can appropriately shape a pulse that is to be transmitted using the most recently updated operational information corresponding to the communication system.

Figure 8B:
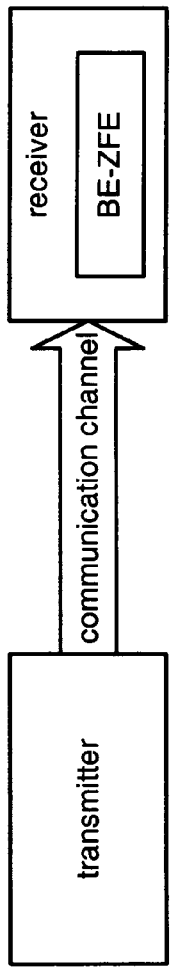
FIG. 8B is a diagram illustrating an embodiment of a BE-ZFE implemented within a receiver of a communication system according to aspects of the invention.

FIG. 8B is a diagram illustrating an embodiment of a BE-ZFE implemented within a receiver of a communication system according to aspects of the invention. This embodiment shows how a BE-ZFE may be implemented within a receiver that is communicatively coupled to a transmitter within a communication system. The BE-ZFE, in this implementation, performs the pulse shaping to a received pulse that has already been warped, or spread, by the imperfections of the communication channel that communicatively couples the transmitter and the receiver. Rather than perform the pulse shaping at the transmitter end, this embodiment performs the pulse shaping at the receiver end.

Figure 8C:
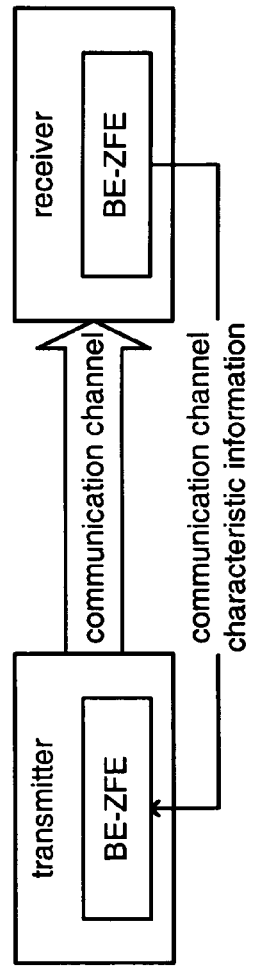
FIG. 8C is a diagram illustrating an embodiment of a BE-ZFE implemented part in a transmitter and part in a receiver of a communication system according to aspects of the invention.

FIG. 8C is a diagram illustrating an embodiment of a BE-ZFE implemented part in a transmitter and part in a receiver of a communication system according to aspects of the invention. The BE-ZFE is distributed between the transmitter and the receiver such that a portion of the pulse shaping may be performed at the transmitter end, and a portion of the pulse shaping may be performed at the receiver end.

With respect to the various embodiments of FIG. 8A, FIG. 8B, and FIG. 8C, it is noted that the BE-ZFE pulse shaping functionality (by providing the zero crossings at the bit edges of the sequence of bit periods) allows for better decision making at the receiver end of a communication channel. Regardless of how and where the BE-ZFE is being implemented (e.g., in transmitter only, in receiver only, or distributed between transmitter and receiver), the BE-ZFE equalization operates in combination with the filter-like signal shaping performed by the communication channel to ensure that zero crossings occur at the bit edges of the signal so that more accurate decision making may be made at the receiver end of the communication channel of any information bits transmitted through the communication channel.

Figure 9:
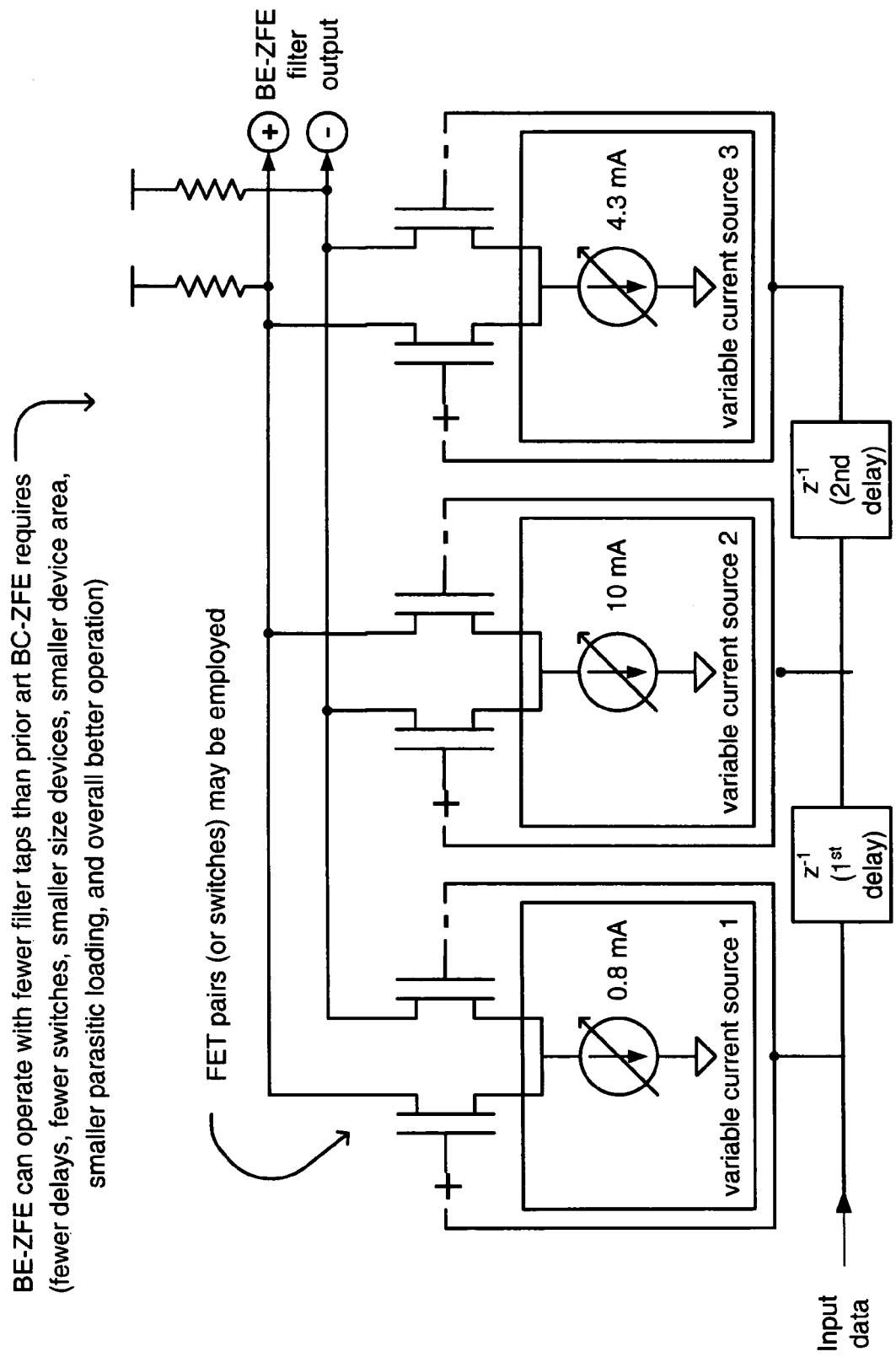
FIG. 9 is a diagram illustrating an embodiment of a 3 filter tap BE-ZFE that may be constructed according to aspects of the invention.

FIG. 9 is a diagram illustrating an embodiment of a 3 filter tap BE-ZFE that may be constructed according to aspects of the invention. This 3 filter tap BE-ZFE is implemented using a number of FET (Field Effect Transistor) pairs that are each communicatively coupled to a variable current source. These FET pairs may be implemented as MOSFET (Metal Oxide Semiconductor Field Effect Transistor) devices as well without departing from the scope and spirit of the invention. The current sources are set to be proportional to the 3 most significant BE-ZFE filter tap coefficients of the truncated vector $H_{BE-ZFE(truncated)}$, i.e., −0.080, 1.000, and −0.430. Hence with variable current source 2 of 10 mA corresponding to the coefficient 1.000, variable current source 1 has 0.8 mA and variable current source 3 has 4.3 mA. The input pulse comes in as input data and is delayed by the 1st $z^{-1}$ delay and then the 2nd $z^{-1}$ delay. The inputs to each of the FET devices of the FET pairs are tied appropriately to the input data or delayed input data. Thus the FET pairs associated with variable current source 1 receives the input pulse. Thus the FET pairs associated with variable current source 2 receives the input pulse after the $1^{st}$ delay. And the FET pairs associated with variable current source 3 receives the input pulse after the $1^{st}$ and $2^{nd}$ delays. Each of the three FET pairs has positive (+) and negative (−) outputs tied to the positive and negative BE-ZFE filter outputs to produce the desired output waveform. Note that the outputs of the positive and negative FET pair for the variable current source 2 is connected to the BE-ZFE filter output opposite to the outputs of the positive and negative FET pairs for variable current sources 1 and 3 to indicate an opposite polarity. Thus an input pulse is appropriately modified by the BE-ZFE filter and the channel such that the modified pulse has zero crossings that coincide with the bit edges within the sequence of bit periods. This may be performed either to provide for zero crossings at the bit edges immediately adjacent to the bit period of interest, i.e., the unmodified pulse bit period, or to all of the other bit edges except for those bit edges immediately adjacent to the bit period of interest.

It is also noted here that the various embodiments of BE-ZFEs shown herein may be implemented such that a sum of the absolute values of each BE-ZFE filter tap coefficient may add up to be substantially equal to one.

Figure 10:
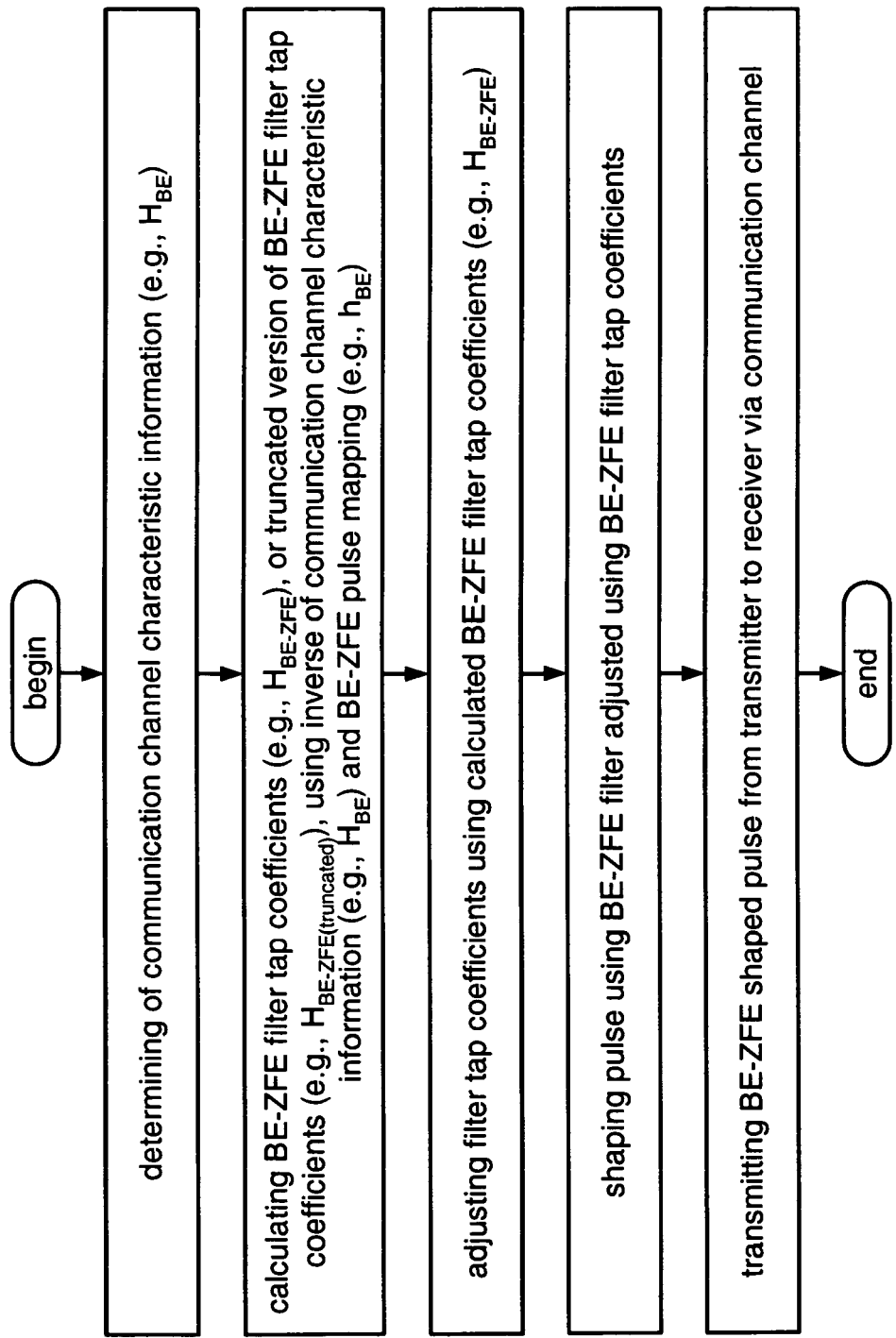
FIG. 10 is a flowchart illustrating an embodiment of a method for performing equalization on a data signal according to Bit-Edge Zero Forcing Equalization according to aspects of the invention.

FIG. 10 is a flowchart illustrating an embodiment of a method for performing equalization on a data signal according to Bit-Edge Zero Forcing Equalization according to aspects of the invention. The method involves determining of communication channel characteristic information (e.g., $H_{BE}$). The method then continues by calculating BE-ZFE filter tap coefficients (e.g., $H_{BE-ZFE}$) using the inverse of the communication channel characteristic information (e.g., $H_{BE}$) and BE-ZFE pulse mapping (e.g., $h_{BE}$). Alternatively, the method may involve calculating the truncated version of BE-ZFE filter tap coefficients (e.g., $H_{BE-ZFE(truncated)}$). Regardless of which form of BE-ZFE filter tap coefficients is employed within a particular embodiment, the method then involves adjusting filter tap coefficients using calculated BE-ZFE filter tap coefficients (e.g., $H_{BE-ZFE}$). The method then involves shaping of a pulse to be transmitted using the BE-ZFE filter such that each filter tap is adjusted using one of the corresponding BE-ZFE filter tap coefficients. The method then involves transmitting the BE-ZFE shaped pulse from a transmitter to a receiver via a communication channel within a communication system.

It is also noted that the methods described within the preceding figures may also be performed within any of the appropriate system and/or apparatus designs (e.g., BE-ZFEs that may be implemented within various communication systems, communication devices, communication transceivers, communication receivers, and/or functionality described therein) that are described above without departing from the scope and spirit of the invention.

In view of the above detailed description of the invention and associated drawings, other modifications and variations will now become apparent. It should also be apparent that such other modifications and variations may be effected without departing from the spirit and scope of the invention.

What is claimed is:

1. A BE-ZFE (Bit-Edge Zero Forcing Equalizer) that comprises:
a filter tap coefficient module that calculates a plurality of filter tap coefficients, the filter tap coefficient module being adapted to truncate the calculated plurality of filter tap coefficients to include only the most significant filter tap coefficients of the plurality of filter tap coefficients;
a filter that includes a plurality of filter taps such that each filter tap is adjusted according to one filter tap coefficient of the truncated plurality of filter tap coefficients;
wherein the filter is enabled to modify an original shape of a pulse in a communication channel, wherein the modified pulse is located within a sequence of bit periods;
wherein the modified pulse has zero crossings located substantially at bit edges of each bit period within the sequence of bit periods except those bit edges immediately adjacent to a bit period in which the pulse is substantially located to enhance detection of the pulse's original data value from the modified pulse; and
wherein the filter tap coefficient module multiplies an inverse of a communication channel transfer function and a pulse mapping to calculate the plurality of filter tap coefficients, wherein the plurality of filter tap coefficients are a plurality of BE-ZFE filter tap coefficients.

2. The BE-ZFE of claim 1, wherein:
the filter tap coefficient module calculates the plurality of filter tap coefficients in real time based on currently updated characteristic information of the communication channel that communicatively couples a transmitter and a receiver.

3. The BE-ZFE of claim 1, wherein:
the filter tap coefficient module calculates the plurality of filter tap coefficients offline based on predetermined characteristic information of the communication channel that communicatively couples a transmitter and a receiver.

4. The BE-ZFE of claim 1, wherein:
a sum of absolute values of each filter tap coefficient of the plurality of filter tap coefficients is substantially equal to one.

5. The BE-ZFE of claim 1, wherein:
the modified pulse substantially minimizes ISI (Inter-Symbol Interference) at bit edges of each bit period within the sequence of bit periods; and
the modified pulse allows a portion of ISI to exist at bit centers of each bit period within the sequence of bit periods.

6. The BE-ZFE of claim 1, wherein:
the plurality of filter taps includes 3 filter taps; and
the truncated plurality of filter tap coefficients includes 3 corresponding filter tap coefficients.

7. The BE-ZFE of claim 1, wherein:
the filter is implemented within a transmitter that is communicatively coupled to a receiver via the communication channel.

8. The BE-ZFE of claim 1, wherein:
the filter is implemented within a receiver that is communicatively coupled to a transmitter via the communication channel.

9. The BE-ZFE of claim 1, wherein:
the filter is implemented in a distributed manner part in a transmitter and part in a receiver; and
the transmitter and the receiver are communicatively coupled via the communication channel.

10. A method for performing equalization on a data signal, the method comprising:
multiplying, by a processing device, an inverted channel characteristic vector by a pulse mapping vector to calculate a plurality of BE-ZFE (Bit-Edge Zero Forcing Equalizer) filter tap coefficients;
truncating the plurality of BE-ZFE filter tap coefficients to include only the most significant filter tap coefficients of the plurality of BE-ZFE filter tap coefficients;
receiving the truncated plurality of BE-ZFE filter tap coefficients;
modifying an original shape of a pulse that is substantially located within a bit period to a modified pulse that is located within a sequence of bit periods using the truncated plurality of BE-ZFE filter tap coefficients;
wherein the modified pulse has zero crossings located substantially at bit edges of each bit period within the sequence of bit periods except those bit edges immediately adjacent to the bit period in which the pulse is substantially located; and
wherein the modified pulse substantially minimizes ISI (Inter-Symbol Interference) at bit edges of each bit period within the sequence of bit periods to enhance detection of the pulse's original data value from the modified pulse.

11. The method of claim 10, wherein calculating the plurality of BE-ZFE filter tap coefficients in real time is based on currently updated characteristic information of a communication channel that communicatively couples a transmitter and a receiver.

12. The method of claim 10, wherein calculating the plurality of BE-ZFE filter tap coefficients offline is based on predetermined characteristic information of a communication channel that communicatively couples a transmitter and a receiver.

13. The method of claim 10, wherein:
a sum of absolute values of each filter tap coefficient of the plurality of BE-ZFE file tap coefficients is substantially equal to one.

14. A method for performing equalization on a data signal according to Bit-Edge Zero Forcing Equalization, the method comprising:
multiplying, by a processing device, an inverted channel characteristic vector by a pulse mapping vector to calculate a plurality of BE-ZFE (Bit-Edge Zero Forcing Equalizer) filter tap coefficients;
truncating the plurality of BE-ZFE filter tap coefficients to include only the most significant filter tap coefficients of the plurality of BE-ZFE filter tap coefficients;
receiving the truncated plurality of BE-ZFE filter tap coefficients;
modifying an original shape of a pulse that is substantially located within a bit period that is located within a sequence of bit periods using the truncated plurality of BE-ZFE filter tap coefficients; and
wherein the modification results in a modified pulse that has zero crossings located substantially at bit edges within the sequence of bit periods to enhance detection of the pulse's original data value from the modified pulse.

15. The method of claim 14, wherein the bit edges are not those bit edges immediately adjacent to the bit period in which the pulse is substantially located.

16. The method of claim 14, wherein:
the modified pulse substantially minimizes ISI (Inter-Symbol Interference) at bit edges of each bit period within the sequence of bit periods.

17. The method of claim 14, wherein
calculating the plurality of BE-ZFE filter tap coefficients in real time is based on currently updated characteristic information of a communication channel that communicatively couples a transmitter and a receiver.

18. The method of claim 14, wherein
calculating the plurality of BE-ZFE filter tap coefficients offline is based on predetermined characteristic information of a communication channel that communicatively couples a transmitter and a receiver.

* * * * *

UNITED STATES PATENT AND TRADEMARK OFFICE
CERTIFICATE OF CORRECTION

PATENT NO. : 7,653,127 B2 Page 1 of 1
APPLICATION NO. : 10/791924
DATED : January 26, 2010
INVENTOR(S) : Brunn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1522 days.

Signed and Sealed this

Twenty-eighth Day of December, 2010

David J. Kappos
*Director of the United States Patent and Trademark Office*